J. H. SMILEY.
Wagon Brake.
No. 78,841.
Patented June 9, 1868.
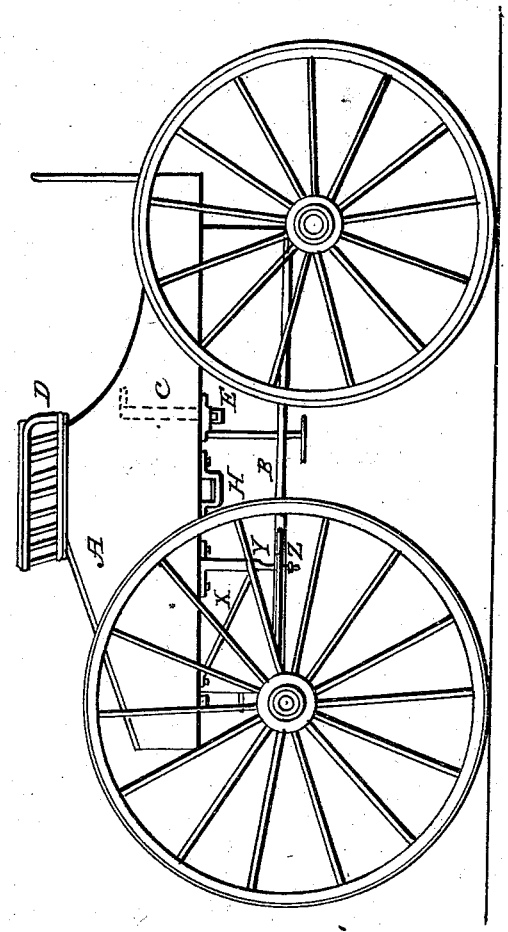
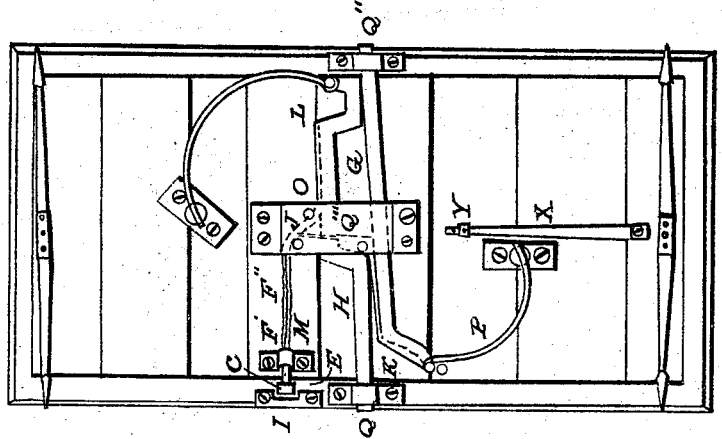
WITNESSES:
INVENTOR,

United States Patent Office.

JAMES HARVEY SMILEY, OF CAROLINE, NEW YORK.

Letters Patent No. 78,841, dated June 9, 1868.

---

IMPROVEMENT IN WAGON-BRAKE.

---

The Schedule referred to in these Letters Patent and making part of the same.

---

TO ALL WHOM IT MAY CONCERN:

Be it known that I, JAMES HARVEY SMILEY, of Caroline, Tompkins county, New York, have invented an Improved Wagon-Brake; and I do hereby declare that the following is a full and exact description thereof, reference being had to the accompanying drawings, and to the letters thereon.

Figure 1 is a view of a buggy with my brake on it, with the brake not in use; Figure 2, of my brake attached to the bottom of a one-horse wagon; which figures show the levers thereof, which are movable outwards at will, and the various other parts connected therewith.

My object is to make a brake suited to one-horse and other light wagons, in an especial manner, but useful in any wagon, with its parts, in a great measure, concealed, but readily and efficiently used at pleasure. For this purpose, I make two levers, and put them out of ordinary sight, under the bottom of the wagon, or in a boxing connected with the bottom, and so made that, by a slide and a cord or strap, operated from the seat of the carriage, they are slid out in front of the wheels, and then against them; and, further, to aid in the action of the brake, I make a brace, which I attach to the body of the carriage, which allows an up-and-down play in the reach of the wagon. This brace is useful for all wagons.

In fig. 1, A is the body of the carriage, and B is the reach of the wagon, and C is the foot-slide, operated from the seat D. The foot-slide connects, at E, with the cords or straps F, which cords or straps connect with the levers G and H, beneath the bottom of the wagon. The brace X is seen fast to the body, and playing in a hole through the reach B. Its action is to prevent the sagging, either backwards or forwards, of the body and springs. The smooth sliding part of the brace, Y, allows motion to the body on the springs, while the nut Z, on the end thereof, prevents its misplacement, and too great upward spring or bounding of the body.

Fig. 2 shows more fully the construction of my brake. At C is the lower end of the foot-slide, having in its end a pulley, and at I is the fastening of one end of the cords or straps F' and F'', and which straps or cords run to the pulley J, and thence the cord F' goes to the angle K in the lever G, and the cord F'' to the angle L in the lever H. The action, so far, is that the foot-slide C, by the pulley in its end, draws the cords in double the space of its downward motion, aided by the pulley M, and thus rapidly thrusts out the levers G and H; and, as soon as the angle L of the lever H passes the pulley O, its cord F'' draws forward the lever H, and the same or similar action takes place with the other cord and lever, and thus the outward ends of the levers bear against the carriage-wheels. The springs P' and P'' retract the whole apparatus as soon as the foot or the pressure is taken off of the slide C. Guide-plates Q' Q'', and other lesser parts, complete the brake.

Thus, I make a brake which does not disfigure the carriage, is mostly concealed, and is readily and efficiently used whenever desired.

The advantages and uses of my brake are apparent to those skilled in the art to which it appertains.

Claim.

The combination and arrangement, consisting of the slide C, the cord or cords F, levers G and H, and springs P, and pulleys and rollers, and plates, as described, making a brake sliding out and against the wheels, and retracting out of sight, substantially as set forth.

JAMES HARVEY SMILEY.

Witnesses:
SAMUEL J. PARKER,
GEO. T. PROSSER.